(12) United States Patent
Müller et al.

(10) Patent No.: US 11,473,633 B2
(45) Date of Patent: Oct. 18, 2022

(54) METHOD FOR CONTROLLING AN AUTOMATED STARTER CLUTCH IN A DRIVE TRAIN OF A MOTOR VEHICLE

(71) Applicant: ZF Friedrichshafen AG, Friedrichshafen (DE)

(72) Inventors: Lutz Müller, Herdwangen-Schönach (DE); Wolfgang Gröner, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 17/296,810

(22) PCT Filed: Dec. 3, 2019

(86) PCT No.: PCT/EP2019/083376
§ 371 (c)(1),
(2) Date: May 25, 2021

(87) PCT Pub. No.: WO2020/114993
PCT Pub. Date: Jun. 11, 2020

(65) Prior Publication Data
US 2022/0003282 A1    Jan. 6, 2022

(30) Foreign Application Priority Data
Dec. 3, 2018 (DE) ...................... 10 2018 220 784.4

(51) Int. Cl.
*F16D 48/08* (2006.01)
(52) U.S. Cl.
CPC .... *F16D 48/08* (2013.01); *F16D 2500/10412* (2013.01); *F16D 2500/3144* (2013.01);
(Continued)

(58) Field of Classification Search
None
See application file for complete search history.

(56) References Cited

U.S. PATENT DOCUMENTS 7,445,582 B2  11/2008  Haerdtle
9,701,301 B2  7/2017  Mair
(Continued)

FOREIGN PATENT DOCUMENTS

CN   1833126 A    9/2006
CN   104973062 A  10/2015
(Continued)

OTHER PUBLICATIONS

German Search Report Corresponding to 10 2018 220 784.4 dated Jul. 26, 2019.
(Continued)

*Primary Examiner* — Timothy Hannon
(74) *Attorney, Agent, or Firm* — Finch & Maloney PLLC; Jay S. Franklin; Michael J. Bujold

(57) ABSTRACT

A method for controlling an automated starter clutch (4) in a drive train of a motor vehicle (1), which drive train has a transmission (3). In at least one first mode, the starter clutch (4) is operated automatically and is transitioned in an event-controlled manner into a second mode, in which the starter clutch (4) can be operated in such a way that upon actuation of the starter clutch (4), at least one jolt-like movement of the motor vehicle (1) is caused. In the second mode, the actuation of the starter clutch (4) is initiated and controlled depending upon operation of an accelerator pedal (13).

16 Claims, 3 Drawing Sheets

(52) U.S. Cl.
CPC ............... *F16D 2500/3166* (2013.01); *F16D 2500/50858* (2013.01); *F16D 2500/7041* (2013.01); *F16D 2500/7101* (2013.01)

(56) References Cited

U.S. PATENT DOCUMENTS

| | | |
|---|---|---|
| 2006/0154785 A1 | 7/2006 | Reith |
| 2008/0039280 A1 | 2/2008 | Petzold |
| 2012/0150402 A1* | 6/2012 | Juhlin-Dannfelt .......................... B60W 30/18027 701/67 |
| 2015/0291167 A1 | 10/2015 | Mair |

FOREIGN PATENT DOCUMENTS

| | | |
|---|---|---|
| DE | 101 09 662 A1 | 9/2002 |
| DE | 103 34 451 A1 | 3/2005 |
| DE | 10 2007 034 052 A1 | 1/2009 |
| DE | 10 2007 055 793 A1 | 6/2009 |
| DE | 10 2009 053 267 A1 | 5/2011 |
| DE | 10 2014 225 474 A1 | 6/2016 |
| EP | 1 610 022 A1 | 12/2005 |
| EP | 2071207 A2 | 6/2009 |

OTHER PUBLICATIONS

International Search Report Corresponding to PCT/EP2019/083376 dated Mar. 13, 2020.
Written Opinion Corresponding to PCT/EP2019/083376 dated Mar. 13, 2020.
Chinese Office Action corresponding to Application No. 201980080101.5 dated Jun. 15, 2022.

* cited by examiner

METHOD FOR CONTROLLING AN AUTOMATED STARTER CLUTCH IN A DRIVE TRAIN OF A MOTOR VEHICLE

This application is a National Stage completion of PCT/EP2019/083376 filed Dec. 3, 2019, which claims priority from German patent application serial no. 10 2018 220 784.4 filed Dec. 3, 2018.

FIELD OF THE INVENTION

The invention relates to a method for controlling a starter clutch in a drive-train of a motor vehicle, which drive-train comprises a transmission, wherein at least in a first mode the starter clutch is operated automatically and, in an event-driven manner, the clutch is changed over to a second mode in which the starter clutch can be operated in such a way that when the starter clutch is actuated at least one jolt-like movement of the motor vehicle takes place. Furthermore, the invention relates to a control unit which is designed to carry out the method and to a corresponding computer program product.

BACKGROUND OF THE INVENTION

In motor vehicles having automated manual transmissions, starter clutches are usually actuated automatically during starting processes. For this, the starter clutch concerned is in most cases actuated by a control unit of the transmission. It is also conceivable for the starter clutch to be actuated by a separate control unit. In order to start off comfortably, the starter clutch is controlled in such manner that it is closed gently and slowly.

Smooth starting off is basically also desired in the case of a motor vehicle in the form of a utility vehicle, wherein, depending on the type of utility vehicle, for example a dumper truck, i.e. a carrier vehicle with a superstructure in the form of a tilting body or a tractor that has a trailer with a tilting body, operating situations can arise in which comfortable starting off is inappropriate, for example for assisting the unloading process of the dumper truck. Such utility vehicles are generally used for the transport of pourable or free-flowing material, so that to unload the material the tilting body is moved to an inclined position by a tilting mechanism powered by an auxiliary power take-off, allowing the material to slide down across the loading area. During this the situation can arise that the material does not slide well or that some of the material to be unloaded remains on the loading area of the tilting body. To compel the sliding of the material during unloading it is known, in the case of a motor vehicle with a manually actuated clutch, to actuate the latter in such manner that the motor vehicle undergoes a jolt-like movement which favors the process of sliding the material off the loading area.

DE 10 2007 055 793 A1 describes a method of that type for controlling an automated starter clutch in a drive-train of a motor vehicle, wherein the starter clutch, at least in a first mode, is operated automatically, in which method the starting process is characterized by a high level of comfort. In addition a second mode is provided, to which the first mode is changed over in an event-driven manner and in which the starter clutch can be operated so that when the starter clutch is actuated, at least one jolt-like movement of the motor vehicle takes place. The activation of the second mode, known as the jolt mode, takes place automatically by a determination of driving condition information that brings about the activation of the jolt mode, or by the manual actuation of an operating element. When the second mode is activated, the starter clutch is controlled in such a way that several jolt movements of the motor vehicle are compelled to take place. The clutch torque transmitted in the second mode is set at a fixed value, or else a value is set as a function of the mass of the vehicle or the inclination of the road.

SUMMARY OF THE INVENTION

Starting from the above-described prior art, the purpose of the present invention is now to enable the control an automated starter clutch in a drive-train of a motor vehicle, which grants an operator the possibility to have a direct influence on the control of the starter clutch while operating in the second mode.

From the procedural standpoint, starting from the preamble of the independent claim(s), this objective is achieved in combination with the characterizing features of the independent claim(s). From the device-related standpoint, the objective is achieved by the technical features of the independent claim(s). The dependent claims that follow in each case describe advantageous further developments of the invention. In addition a computer program product is another object of the independent claim(s).

According to the invention a method for controlling an automated starter clutch in a drive-train of a motor vehicle, which drive-train comprises a transmission is proposed, wherein at least in a first mode the starter clutch is operated automatically and, in an event-driven manner, a change-over takes place to a second mode in which the starter clutch can be operated in such a way that when the starter clutch is actuated, at least one jolt-like movement of the motor vehicle takes place.

The motor vehicle is preferably a utility vehicle, in particular a dumper truck or an agricultural or communal tractor vehicle with a trailer having a tilting body. The event-driven change-over to the second mode for operating the starter clutch means that the change-over from the first mode to the second mode only takes place if at least one defined prerequisite is satisfied. This is intended to ensure that the second mode can only be activated when it is necessary to do so.

Now, the invention is based on the technical principle that in the second mode, the actuation of the starter clutch is initiated and controlled as a function of an actuation of a accelerator pedal. The method according to the invention enables an operator, by actuating the accelerator pedal while operating in the second mode, to have a direct influence on the control of the starter clutch. The result of actuating the accelerator pedal is that the starter clutch is actuated to carry out at least one dynamic closing and opening movement of the starter clutch, the parameters of the movement being determined by the actuation of the accelerator pedal.

Thus, the starter clutch can be actuated to carry out at least one consecutive closing and opening movement with a clutch travel path whose variation is determined as a function of the accelerator pedal position. For this the accelerator pedal position, in particular the accelerator pedal angle or the adjustment path of the accelerator pedal can be detected by a sensor and evaluated. With reference to the change of the accelerator pedal position, i.e. the accelerator pedal's position change relative to an initial position of the accelerator pedal, the clutch travel path of the at least one consecutive closing and opening movement that should be chosen on the part of the operator can be determined.

Furthermore, to carry out the at least one consecutive closing and opening movement, the starter clutch can be actuated with a clutch gradient whose order of magnitude is determined as a function of the actuation of the accelerator pedal. The clutch gradient corresponding to the actuation of the accelerator pedal can depend on the accelerator pedal angle or the adjustment path of the accelerator pedal. For example, however, the clutch gradient could also be determined as a function of the actuation rate of the accelerator pedal. In that case a slow actuation of the accelerator pedal in order to change the accelerator pedal's position could result in a smaller increase of the clutch gradient than a rapid actuation of the accelerator pedal.

Preferably, a time interval within which the starter clutch is controlled to carry out at least one consecutive closing and opening movement can be determined as a function of the time during which the accelerator pedal is actuated. In that way the operator can determine the duration of a phase by holding the actuated accelerator pedal in a position different from its initial position, within which phase the consecutive closing and opening movements take place.

Preferably, the change-over from the first mode to the second mode is initiated by the manual actuation of an operating element. Moreover, after actuating the operating element the operator can receive a visual or audio-visual acknowledgement message that the change into the second more or from the second mode back into the first mode has taken place. In that way it can be ensured that the operator is informed about the changed starting behavior, which in the second mode results from the actuation of the accelerator pedal.

According to a preferred further development, the second mode can only be activated if the presence of at least one vehicle condition datum which is a prerequisite for carrying out the at least one consecutive closing and opening movement by actuating the starter clutch, is determined.

For that purpose, as the prerequisite a shift position of the transmission different from its neutral position can be determined as the at least one vehicle condition datum.

In addition or alternatively, as a prerequisite the activation of a power take-off for driving a tilting mechanism can be determined as the at least one vehicle condition datum.

Furthermore, in the second mode, after the initiation by actuating the accelerator pedal, a service brake system can be activated automatically by returning the accelerator pedal to its initial position. In that way the process of carrying out the consecutive closing and opening movements, in particular repeatedly, can be optimized with regard to its efficiency. The automatic braking by the service brakes at the end of a phase during which consecutive closing and opening movements have been carried out produces a contrary acceleration due to which any material still remaining is caused to move in order to free the loading area from the rest of the material. Furthermore, due to the automatic activation of the service brakes the number of consecutive closing and opening movements can be reduced.

Preferably, during the opening of the starter clutch in the second mode due to the return of the accelerator pedal to its starting position, a further actuation of the accelerator pedal can initiate a renewed actuation of the starter clutch. This enables the operator, after a first phase of consecutive closing and opening movements, to check the result and if needs be, by virtue of the renewed actuation of the accelerator pedal to initiate at least one further phase of consecutive closing and opening movements with different parameters.

In addition the objective stated at the start is achieved in accordance with the independent claim (s).

Within a motor vehicle drive-train the method according to the invention is preferably regulated by a control unit for the control of an automated starter clutch, wherein the control unit is designed to operate the starter clutch automatically in at least a first mode, and to change it over to a second mode in an event-driven manner, so that, by actuating the starter clutch, at least one jolt-like movement of the motor vehicle takes place, wherein the control unit is also designed to initiate and control the actuation of the starter clutch as a function of an actuation of an accelerator pedal. By virtue of the manual actuation of the accelerator pedal by the operator, information is sent to the control unit with reference to which the actuation of the starter clutch is carried out. The operator directly influences the actuation of the starter clutch to bring about at least one jolt-like movement of the motor vehicle.

In particular, the control unit can be designed to carry out a process according to one or more of the claims.

According to the independent claim(s) the system according to the invention can also be incorporated as a computer program product with program code means which are stored on a computer-readable data carrier, in order to carry out a method for controlling an automated clutch in a drive-train of a motor vehicle in accordance with the claim(s), when the computer program product runs on a computer or on an appropriate computation unit, in particular a control unit according to the claim(s).

The invention is not limited to the indicated combination of the features of the independent claims or the claims that depend on them. There are in addition possibilities for combining individual features with one another insofar as they emerge from the claims, the following description of preferred embodiments of the invention, or directly from the drawings. References in the claims to the drawings by the use of indexes are not intended to restrict the protective scope of the claims.

BRIEF DESCRIPTION OF THE DRAWINGS

An advantageous embodiment of the invention, which is explained below, is illustrated in the drawings, which show.

DETAILED DESCRIPTION OF THE PREFERRED EMBODIMENTS

Figure 1:
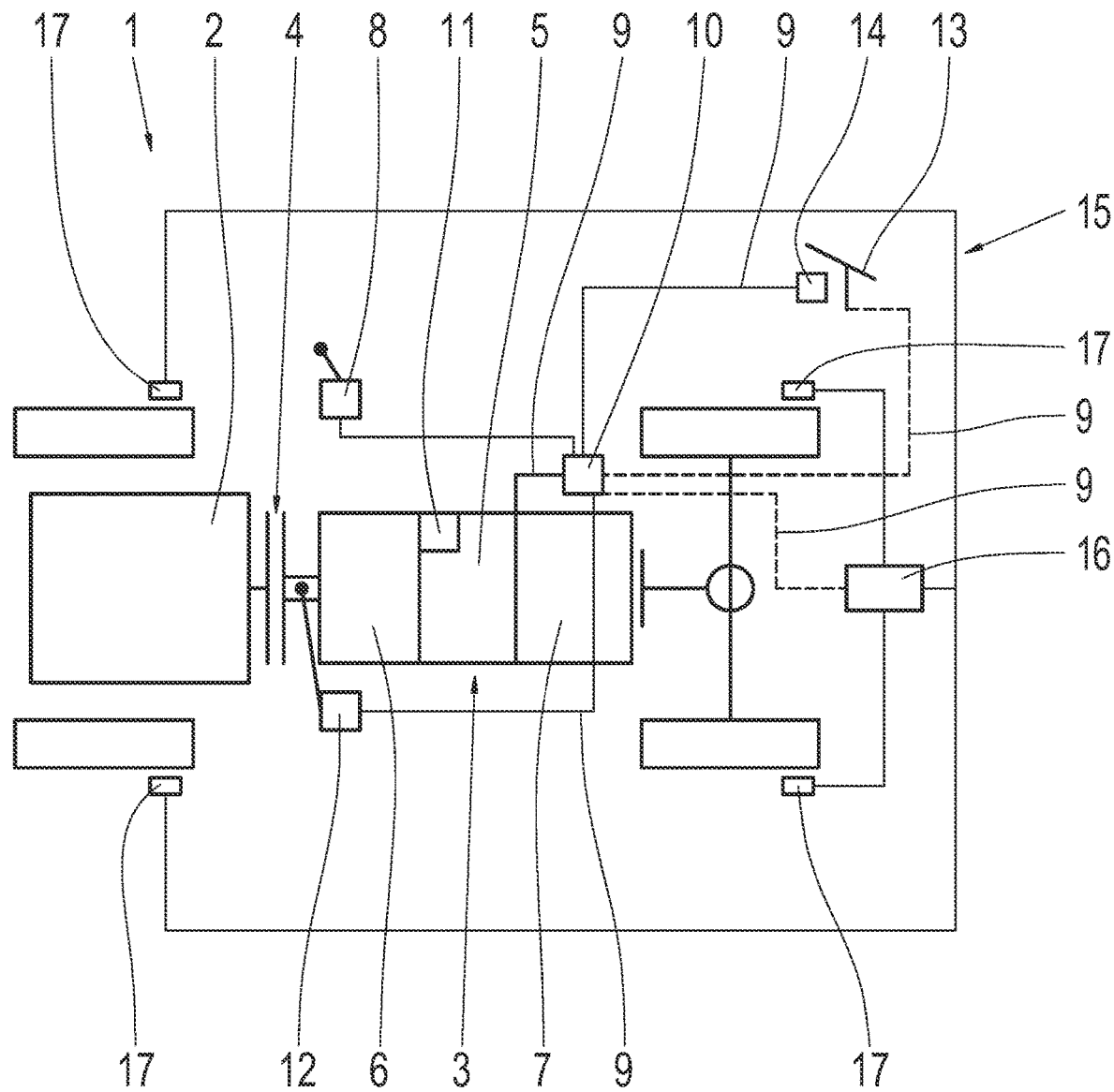
FIG. 1: A schematic representation of a motor vehicle with an automated transmission and an automated starter clutch.

FIG. 1 shows a motor vehicle 1, in particular a utility vehicle, with a drive unit 2, an automated transmission 3 and arranged between them is an automated starter clutch 4. The motor vehicle 1 in the form of a utility vehicle is particularly preferably a dumper truck. The transmission 3 has a main transmission section 5, a splitter group transmission 6 and a range group transmission 7. The transmission 3 is connected to a control unit 10 by way of a bus system 9. An operating element 8 that can be actuated manually is connected by the bus system 9 to the control unit 10. The transmission 3 is shifted automatically by an adjusting device 11 in accordance with signals that are received by the adjusting device 11 from the control unit 10. In addition a clutch adjuster 12 is provided for the automatic actuation of the starter clutch 4. The clutch adjuster 12 is connected by the bus system 9 to the control unit 10 and receives signals from the control unit 10 for the automatic control of the starter clutch 4. An accelerator pedal 13 is connected by the bus system 9 to receive signals from the control unit 10. A sensor arrangement 14 associated with the accelerator pedal 13 determines operating parameters of the accelerator pedal 13 actuated by an operator, such as the accelerator pedal angle or the adjustment travel of the accelerator pedal 13 as well as the duration of actuation. From this, starting from an initial position of the accelerator pedal 13, the adjustment angle or the adjustment travel resulting from the actuation of the accelerator pedal 13 can be determined.

From the transmission 3 there branches off an auxiliary power take-off—not shown—which serves in a motor vehicle 1 designed as a dumper truck to actuate a tilting device. The tilting device can be actuated by the control unit 10 or by a separate control unit. To activate the tilting device or the power take-off an operating means is provided. By activating the tilting device a loading area of the motor vehicle 1 is moved to a position inclined relative to the road or subsurface so that the load in the form of pourable or free-flowing material starts sliding in order to unload. During this it can occur in some cases that the load does not slide easily or completely off the loading area. To achieve complete unloading, the starter clutch 4 is actuated so as to carry out at least one consecutive closing and opening movement in order to help the load, or the remainder of the load to slide off.

The wheels of the motor vehicle 1 are each assigned a wheel brake 17 of a service brake system 15 of the motor vehicle 1, each wheel being braked when it actuated. The service brake system 15 is controlled by a brake control unit 16 connected to the control unit 10 by the bus system 9.

Figure 2:
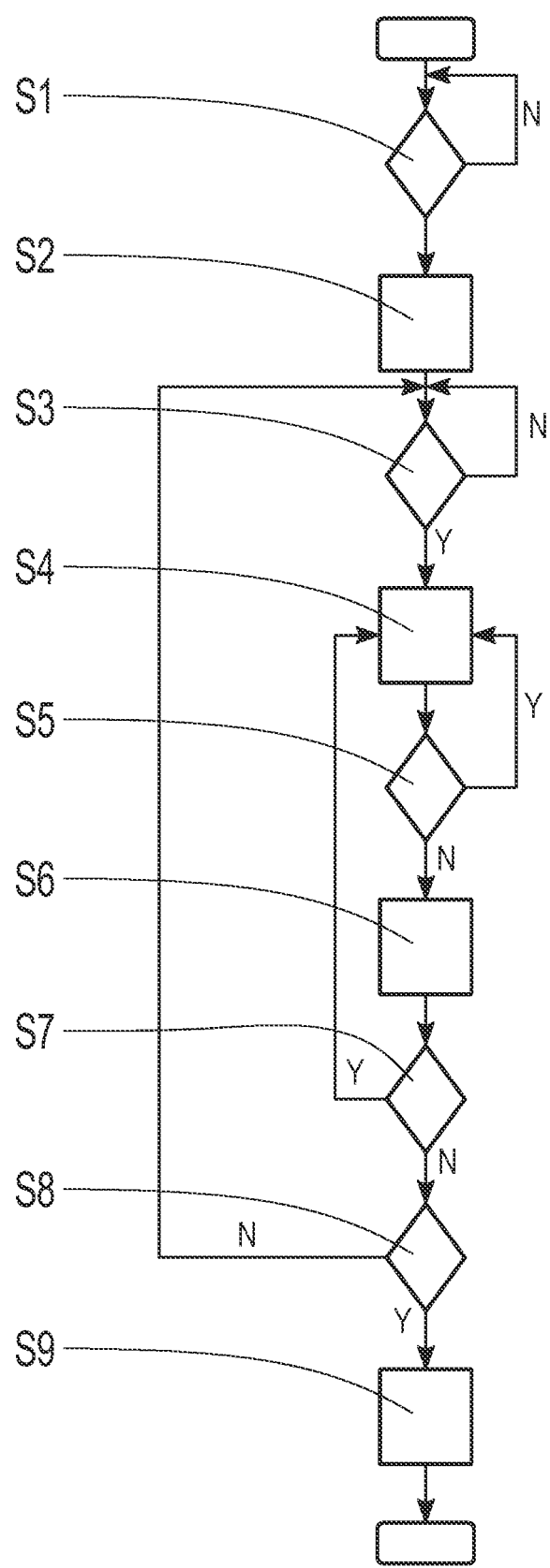
FIG. 2: A flow chart of a method for controlling the automated starter clutch in a drive-train as in FIG. 1.

In at least a first mode the starter clutch 4 is operated automatically. In this first mode the starter clutch 4 or its control device 11 is actuated by the control unit 10 in such manner that a particularly comfortable, in particular jolt-free starting of the motor vehicle 1 is made possible. In an event-driven manner the operation of the starter clutch 4 is changed over to a second mode. An event that leads to a change from the first mode to the second mode, is the actuation of the operating element 8, which in particular can be in the form of a locking switch. In the second mode, when the starter clutch 4 is actuated by the control unit 4 a jolt-like movement of the motor vehicle takes place. For this, the control unit 10 regulates the starter clutch 4 in accordance with the process shown in the flow chart of FIG. 2:

At the beginning of the process, in a step S1 it is first queried whether an operator of the motor vehicle has manually actuated the operating element 8. In addition, in the first step S1 at least a first vehicle condition datum can be asked for. The at least one vehicle condition datum can be an inquiry whether a gear, a forward gear or a reversing gear is engaged, i.e. whether the transmission 3 is in a shift position other than the neutral position. As another vehicle condition datum, it can be asked whether the power take-off or the tilting mechanism of the motor vehicle 1 is active.

If this is answered in the negative, the system reverts to the beginning and no further action is taken until the operator carries out an activation. On the other hand, if the result in step S1 is positive, i.e. if all the prerequisites for a change-over from the first mode to the second mode are fulfilled, then the system advances to a step S2 in which the second mode for controlling the starter clutch 4 is activated.

In the next step S3, it is checked whether the accelerator pedal 13 is actuated. The actuation of the starter clutch 4 is initiated by actuating the accelerator pedal 13. If the accelerator pedal 13 has not been actuated by the operator of the motor vehicle 1, the system reverts to before step S3. If the accelerator pedal 13 has been actuated, the system advances to step S4.

In step S4 the actuation of the accelerator pedal 13 monitored by the sensor arrangement 14 is evaluated. The signals from the sensor arrangement 14 can be evaluated directly by the control unit 10 or by an additional control unit which transmits the data resulting from the evaluation to the control unit 10.

In step S4 the accelerator pedal setting of the accelerator pedal 13, i.e. the accelerator pedal angle or the adjustment travel path of the accelerator pedal 13 is determined. With reference to the accelerator pedal angle or the adjustment travel path of the accelerator pedal 13, the starter clutch 4 is actuated so as to carry out at least one consecutive closing and opening movement with a clutch travel whose size is determined as a function of the accelerator pedal setting, i.e. the accelerator pedal angle or the adjustment travel path of the accelerator pedal. Furthermore, in step S4 the starter clutch 4 is actuated so as to carry out at least one consecutive closing and opening movement with a clutch gradient whose size is also determined as a function of the accelerator pedal setting. Alternatively, when the accelerator pedal 13 is actuated, instead of the accelerator pedal angle or the adjustment travel path a pressure exerted during the actuation of the accelerator pedal 13 can be detected by a sensor and evaluated, which pressure forms the basis for the actuation of the starter clutch 4.

In the next step S5, the persistence of the accelerator pedal's actuation and the actuation duration that follows from it are monitored and evaluated by the operator. As a function of the actuation duration a time interval is determined, within which the starter clutch 4 is actuated so as to carry out the at least one consecutive closing and opening movement. If the actuation of the accelerator pedal 13 by the operator persists, the system reverts to step S4. By virtue of this spring-back to step S4 it can be checked whether there has meanwhile occurred any significant change of the accelerator pedal's position. Any such significant change of the accelerator pedal's position can lead to an adaptation of the clutch travel path and clutch gradient parameters. Otherwise, the system advances to step S6.

In step S6 the service brakes 15 can be actuated in order to terminate the process of jolting the motor vehicle 1. By actuating the service brakes at the end of a phase of consecutive closing and opening movements, an additional impulse is produced by virtue of which the unloading process can be optimized. In that way the number of consecutive closing and opening movements that produce the jolt-like movements of the motor vehicle 1 can be reduced.

In step S7 it is queried whether the accelerator pedal 13 has been actuated again. If so, the system reverts to step S4 so that the actuation of the starter clutch 4 that corresponds to the parameters newly determined in step S4, which result from the actuation of the accelerator pedal 13, is continued. On the other hand, if in step S7 it is found that the operator has not actuated the accelerator pedal 13 again, the system advances to step S8.

In step S8 it is queried whether the prerequisites for the actuation of the starter clutch 4 in the second mode by the control unit 10 are still in place. In particular, it is queried whether by an actuation of the operating element 8 the second mode has been deactivated. If deactivation due to the changed switch position of the operating element 8 is detected, the system advances to step S9. Otherwise it reverts to before step S3, in which the actuation of the starter clutch 4 by actuating the accelerator pedal 13 is monitored.

In step S9 the change to the first mode, in which the starter clutch 4 is operated automatically, is carried out. After step S9, the process has terminated.

Figure 3:
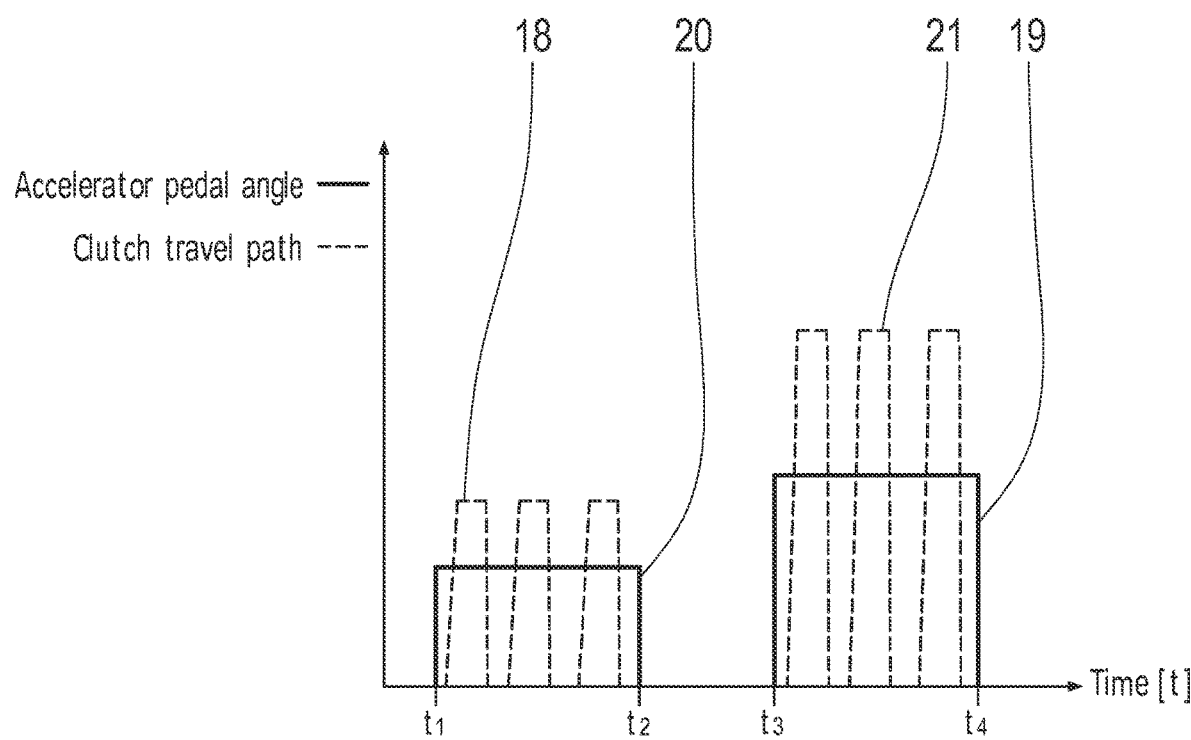
FIG. 3: A diagram in which example variations of an accelerator pedal angle and variations of a clutch travel path are plotted against time.

FIG. 3 shows a diagram in which example variations 19, 20 of an accelerator pedal angle and variations 18, 21 of a clutch travel path are plotted against time. The respective variations 19, 20 of the accelerator pedal angle are shown by solid lines whereas the corresponding variations 18, 21 of the clutch travel are shown by broken lines.

Assuming that the second mode is active, the actuation of the accelerator pedal 13 by the operator of the motor vehicle 1 at time $t_1$ results in an initiation of the actuation of the starter clutch 4. Then, in the second mode the starter clutch 4 is also actuated as a function of the actuation of the accelerator pedal 13. Depending on the determined order of magnitude of the change of the accelerator pedal's position starting from the initial position of the accelerator pedal 13, in this case the size of the sensor-determined accelerator pedal angle, the clutch travel path to be covered is determined, which is shown by the variation 20. In addition the clutch gradient can also be determined as a function of the order of magnitude of the change of the accelerator pedal's position detected. In other words, from the manner of the actuation of the accelerator pedal 13 the operator determines how the starter clutch 4 is actuated in the second mode. The actuation of the starter clutch 4 in accordance with the parameters determined from the accelerator pedal actuation is continued until time $t_2$, when the operator returns the accelerator pedal 13 to its initial position. The duration of actuation of the accelerator pedal 13, i.e. the time interval between times $t_1$ and $t_2$, determines the length of the phase of consecutive closing and opening movements. At the end of the actuation duration of the accelerator pedal 13, namely after time $t_2$, the actuation of the service brakes 15 described above under step S6 can be carried out. At time $t_3$ the accelerator pedal 13 is actuated again, but with a larger accelerator pedal angle. The actuation of the accelerator pedal 13 with an accelerator pedal position different from that during the phase between times $t_1$ and $t_2$ results, in the example embodiment illustrated, in a change of the clutch travel and the clutch gradient for the actuation of the starter clutch 4 by the control unit 10. At time $t_4$ the phase of consecutive closing and opening movements of the starter clutch 4 initiated by the new actuation of the accelerator pedal 13 comes to an end. On completion of this further phase, the actuation of the service brakes 15 described earlier under step S6 can again be carried out by the control unit 10.

INDEXES

1 Motor vehicle
2 Drive unit
3 Transmission
4 Starter clutch
5 Main transmission section
6 Splitter group transmission
7 Range group transmission
8 Operating element
9 Bus system
10 Control unit
11 Adjusting device
12 Clutch adjuster
13 Accelerator pedal
14 Sensor arrangement
15 Service brakes
16 Brake control unit
17 Wheel brake
18 Clutch travel path variation
19 Accelerator pedal angle variation
20 Accelerator pedal angle variation
21 Clutch travel path variation
S1 to S9 Individual steps

The invention claimed is:

1. A method for controlling an automated starter clutch in a drive-train of a motor vehicle in which the drive-train has a transmission, the method comprising:
   in a first mode, automatically operating the starter clutch and changing the starter clutch over in an event-driven manner to a second mode in which the starter clutch is operable in such a way that when the starter clutch is actuated, at least one jolt-like movement of the motor vehicle occurs, and
   in the second mode, initiating the actuation of the starter clutch and controlling the actuation of the starter clutch by an actuation of an accelerator pedal.

2. The method according to claim 1, further comprising, to bring about at least one consecutive engaging and disengaging movement, actuating the starter clutch with a clutch travel path whose variation is determined as a function of a position of the accelerator pedal.

3. The method according to claim 1, further comprising, to bring about at least one consecutive engaging and disengaging movement, actuating the starter clutch with a clutch gradient whose order of magnitude is determined as a function of the actuation of the accelerator pedal.

4. The method according to claim 1, further comprising, determining a time interval within which the starter clutch is actuated to bring about at least one consecutive engaging and disengaging movement, as a function of the time during which the accelerator pedal is actuated.

5. The method according to claim 1, further comprising either activating or deactivating the second mode by manual actuation of an operating element.

6. The method according to claim 5, further comprising activating the second mode when a presence of at least one vehicle condition datum is determined, which is a prerequisite for carrying out the at least one consecutive engaging and disengaging movement by the actuation of the starter clutch.

7. The method according to claim 6, further comprising, as the prerequisite, determining a deviation of a shift position of the transmission from a neutral position thereof as the at least one vehicle condition datum.

8. The method according to claim 6, further comprising, as the prerequisite, determining activation of an auxiliary power take-off for driving a tilting device as the at least one vehicle condition datum.

9. The method according to claim 1, further comprising, when a change-over occurs from either the first mode to the second mode or from the second mode to the first mode, emitting either a visual or an audio-visual acknowledgment message.

10. The method according to claim 1, further comprising, in the second mode, after its initiation by the actuation of the accelerator pedal, activating a service brake of the motor vehicle upon a return of the accelerator pedal to a starting position.

11. The method according to claim 1, wherein during the operation of the starter clutch in the second mode, by returning the accelerator pedal to a starting position, initiating a new actuation of the starter clutch by a new actuation of the accelerator pedal.

12. A computer program product with program code means which are stored on a computer-readable data carrier, for carrying out a method according to claim 1 for the control of the automated starter clutch in the drive-train of the motor vehicle, when the computer program product is stored on a computer for controlling the automated starter clutch.

13. The computer program product with program code means according to claim 12, wherein the computer is a control unit for controlling the automated starter clutch.

14. A control unit for controlling an automated starter clutch in a drive-train of a motor vehicle, the drive-train having a transmission,
wherein the control unit is designed to operate the starter clutch automatically at least in a first mode and, in an event-controlled manner, to change over to a second mode in order, by actuating the starter clutch, to bring about at least one jolt-like movement of the motor vehicle, the control unit is designed such that, in the second mode, the control unit initiates and controls the actuation of the starter clutch as a function of an actuation of an accelerator pedal.

15. The control unit according to claim 14, wherein the control unit being configured to initiate and control actuation of the automated starter clutch to bring about at least one consecutive engaging and disengaging movement, the control unit actuating the starter clutch with a clutch travel path as a function of a position of the accelerator pedal.

16. A method of controlling an automated starter clutch in a drive-train of a motor vehicle in which the drive-train has a transmission, the method comprising:
- in a first mode, automatically operating the starter clutch and changing over the starter clutch in an event-driven manner to a second mode in which the starter clutch is operable in such a way that when the starter clutch is actuated, at least one jolt-like movement of the motor vehicle occurs, and
- in the second mode, initiating and controlling the actuation of the starter clutch by an actuation of an accelerator pedal.

\* \* \* \* \*